United States Patent [19]

Hershey et al.

[11] Patent Number: 5,204,901
[45] Date of Patent: Apr. 20, 1993

[54] PUBLIC KEY CRYPTOGRAPHIC MECHANISM

[75] Inventors: John E. Hershey, Ballston Lake, N.Y.; Radha Krishna R. Yarlagadda, Stillwater, Okla.; Lawrence H. Ozarow, Brookline, Mass.

[73] Assignee: General Electric Company, Schenectady, N.Y.

[21] Appl. No.: 739,263

[22] Filed: Aug. 1, 1991

[51] Int. Cl.$^5$ ............................................. H04K 9/00
[52] U.S. Cl. ........................................ 380/21; 380/30
[58] Field of Search ........................ 380/21, 29, 30, 28

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,736,423 | 4/1988 | Matyas | 380/30 |
| 4,864,615 | 9/1989 | Bennett et al. | 380/21 |
| 4,932,056 | 6/1990 | Shamir | 380/30 |
| 4,933,970 | 6/1990 | Shamir | 380/30 |
| 4,964,164 | 10/1990 | Fiat | 380/30 |
| 5,016,274 | 5/1991 | Micali et al. | 380/30 |

OTHER PUBLICATIONS

R. Merkle, "Secrecy, Authentication, and Public Key Systems", Ph.D. Dissertation, Dept. of Electrical Engineering, Stanford Univ., (Jun. 1979).
L. Adleman, "A Subexponential Algorithm for the Discrete Logarithm with Applications to Cryptography", Proceedings of the 20th Annual Symposium on Foundations of Computer Science, Oct. 29–31, 1979.
R. Merkle, "Secure Communications Over Insecure Channels", Communications of the ACM, vol. 21, pp. 294–299 (1978).
W. Diffie & M. Hellman, "Privacy and Authentication: An Inroduction to Cryptography", Proceedings of the IEEE, vol. 67, pp. 397–427.

Primary Examiner—Salvatore Cangialosi
Attorney, Agent, or Firm—Marvin Snyder; James C. Davis, Jr.

[57] ABSTRACT

A public key cryptographic mechanism provides a measurable degree of minimum security, in an ensemble sense, for two Parties, A and B, to establish a commonly held private cryptographic keying variable between them for establishing communications. Both parties randomly generate m-bit vectors vec_A and vec_B, store the vectors, then copy the vectors and add m-bit vectors containing n ones. The vectors thus modified are exchanged between the parties. Both parties then respectively bit-by-bit combine, by Exclusive-Or logic, their stored m-bit vectors vec_A and vec_B with a received vector, denoted rec_B and rec_A, to generate respective vectors W_A and W_B. Parties A and B then generate all $$\binom{m}{n}$$

vectors at a Hamming distance n from W_A and W_B respectively. These $$\binom{m}{n}$$

vectors are each bit-by-bit added, using Exclusive-Or logic, with their encryptions under a publicly known keying variable $K_1$, forming image vectors. Both parties exchange their image vectors in random order. Both parties then determine the matches between the image vectors they have sent and received, allowing them to determine a commonly held m-bit vector X. Vector X is then used to derive a keying variable for a single key encryption algorithm by encrypting it under the DES ECB/ENCRYPT mode keyed by a publicly known keying variable $K_2$.

5 Claims, 6 Drawing Sheets

1

PUBLIC KEY CRYPTOGRAPHIC MECHANISM

BACKGROUND OF THE INVENTION

1. Field of the Invention

The present invention generally relates to an implementation of a public key cryptographic mechanism based on the characteristics of those processes that allow cooperating parties to create information between them that is, on average, corrupted by errors but is far less corrupted than an estimate of that information gleaned by an interloping interested party. The problem solved is the establishment of a secret between two parties who must carry out all communications over a channel that can be monitored by any interested party. The goal is more specific in that the invention provides a privacy cryptographic mechanism and implementation that guarantees that an interloper must perform an average amount of work to recover the secret that is much greater than the amount of work required to create the secret between the two parties. Thus, while the invention does not afford high grade cryptographic security for information requiring long term protection, it is useful in situations where protection of time sensitive information is required. In some applications, it may be necessary to provide only a few seconds of protection.

2. Description of the Prior Art

In classical cryptography, it is a primary tenet that the opposition is presumed to be in possession of the encryption algorithm and that system security rests on a single secretly held keying variable. This keying variable must be securely distributed to the parties involved prior to the commencement of secure communications. Distribution, protection, and control of these keying variables falls under the rubric of keying variable management. The pressure and pace of modern communications requirements has elevated keying variable management to an extremely important and high visibility aspect of almost every modern secure communications system.

It is for these reasons that public key, or two key, cryptography has captured the attention and imagination of the secure communications system architect. For with public key cryptography, it is possible under many actual situations to generate keying variables electronically and securely over unprotected communication channels. That such a concept was indeed possible was publicly posited by R. Merkle in "Secure Communications Over Insecure Channels", *Communications of the ACM*, vol. 21, pp. 294–299 (1978), which is incorporated herein by reference.

In Merkle's system, the two parties that wish to create a secret between them do so by Party A's creating N puzzles and sending them to Party B. A puzzle is a set of mathematical work that requires, on average, a certain number of trials to solve. A simple cryptographic system would qualify as a puzzle and could be realized, as suggested by Merkle, out of the Data Encryption Standard (DES) as promulgated by the then National Bureau of Standards in Federal Information Processing Standards Publication number 46 (1977). The way that the DES could serve as a puzzle would be to operate it in a reduced key space; i.e., by publicly announcing that a significant number of specific keying variable bits would be preset to publicly announced values and that the puzzle would be to correctly determine the remaining keying variable bits which were randomly picked by the puzzle maker. Solution would be indicated to the puzzle solver by the successful decryption of a checkword which is the encryption of a known, publicly announced plaintext word. The puzzle also has as its plaintext a puzzle number and a keying variable that is to be used for further communication.

Proceeding on, Party A sends the created puzzles to Party B in random order. Party B selects one puzzle at random and solves it. Party B then informs Party A of the puzzle number that it has solved, and then Parties A and B communicate using a standard or classical cryptographic system that is keyed by the keying variable which has also been provided by the solved puzzle.

The security assessment of the Merkle system shows that if it takes S units of work to solve any one puzzle, on the average, and if Party A has sent N puzzles, then Party B has to perform S units of work, but an interloper has to perform, on the average, (N/2)S units of work. If N is on the order of S, then the interloper has to perform, on the average, $O(S^2)$ work units, where $O()$ is the usual mathematical "order" expression.

Public Key Cryptographic Systems have been devised that require the interloper to perform work on the average that grows not as a square but exponentially. Such a system was announced by W. Diffie and M. Hellman in "Privacy and Authentication: An Introduction to Cryptography", *Proceedings of the IEEE*, Vol. 67, pp. 397–497 (1979), which is incorporated herein by reference. In the Diffie-Hellman system, two Parties, A and B, are allowed to create a mutually held secret quantity which could be used, for example, as a keying variable for a one key classical cryptographic system. The Diffie-Hellman system is summarized below:

| PARTY A | PARTY B |
| --- | --- |
| Picks a secret number X | Picks a secret number Y |
| Calculates $r^X$ mod p and sends it to Party B | Calculates $r^Y$ mod p and sends it to Party A |
| Receives $r^x$ mod p and raises it to the X power reducing result mod p | Receives $r^x$ mod p and raises it to the Y power reducing mod p |

In the Diffie-Hellman system, p, a large prime number, is publicly known as well as r, a primitive root of p. After performing the steps outlined above, both Parties, A and B, possess $r^{XY}$ mod p (without either party knowing, or needing to know, the other's secret number). A passive interloper, i.e., a party monitoring only the exchanges between Parties A and B, could calculate $r^{XY}$ mod p if able to solve for either X or Y. The cryptosecurity strength of the Diffie-Hellman system is thus no stronger than the apparently significant asymmetric complexity between performing exponentiation (which is relatively easy) and solving the discrete logarithm problem (which is relatively hard) in various finite fields.

Exponentiation requires $O(\log_2 p)$ work. R. Merkle and L. Adleman have independently devised an algorithm that will compute discrete logarithms with work $o(e\sqrt{k(\ln p)(\ln(\ln p))})$ Thus, the ratio of work required to take logarithms to the work to exponentiate is extremely large providing that the Merkle/Adleman procedure is nearly optimal. See, for example, R. Merkle, *Secrecy, Authentication, and Public Key Systems*, Ph.D. dissertation, Department of Electrical Engineering, Stanford University (Jun., 1979), and L. Adleman, "A Subexponential Algorithm for the Discrete Logarithm with Applications to Cryptography", *Proceedings of the 20th Annual Symposium on foundations of Computer Science* (Oct. 29-31, 1979), both of which are incorporated herein by reference. To promote confidence in the discrete logarithm problem, p should be very large, perhaps hundreds of digits long. Execution of this particular public key system, and most public key systems, entails a large computational overhead. In addition, the minimum cost of performing the discrete logarithm problem is not known nor is it known that there is no attack better than by attempting to take the discrete logarithm.

In the patented literature, the following U.S. patents are considered relevant prior art. U.S. Pat. No. 4,200,770 to Hellman et al. discloses a cryptographic apparatus and method. U.S. Pat. No. 4,218,582 to Hellman et al. discloses a public key cryptographic apparatus and method. U.S. Pat. No. 4,424,414 to Hellman et al. discloses an exponentiation cryptographic apparatus and method. U.S. Pat. No. 4,405,829 to Rivest et al. discloses a cryptographic communications system and method. The Rivest et al. patent discloses the so-called RSA (for Rivest, Shamir and Adleman, the inventors) algorithm, a well-known public-key algorithm. A discussion of the RSA and other public-key algorithms may be had by reference to C. Meyer and S. Matyas, *Cryptography: A New Dimension in Computer Data Security*, Wiley (1982). See also J. Hershey and R. Yarlagadda, *Data Transportation and Protection*, Plenum Press (1986).

SUMMARY OF THE INVENTION

It is therefore an object of the present invention to provide a public key cryptographic mechanism that will enable, in a practical way, communicating parties to quickly establish a mutually held keying variable through expending S units of work, on the average, but will require an interloper, on the average, to expend on the order of $S^2$ such work units in order to determine the keying variable. This asymmetry in work can be translated to a time delay between the mutual establishment of the keying variable between the communicating parties and the interloper learning the keying variable. This delay may be required to be only on the order of a few seconds for some particular communications systems served by the public key encryption mechanism. The present invention also requires that the communicating parties have a large communications bandwidth between them.

It is an another object of this invention to provide a system that can be used for privacy only, that is, a system which provides security for time sensitive material only, such as to be found in certain tactical communications scenarios.

The invention contemplates a public key cryptographic system that is capable of providing a measurable degree of minimum security in an ensemble sense. The system enables two Parties, A and B, to establish a commonly held private cryptographic keying variable between them by first establishing publicly disclosed or known keying variables $K_1$ and $K_2$ for use by both parties. Both parties then randomly generate m-bit vectors, denoted vec_A and vec_B. In the preferred embodiment, m is 64. The generated vectors vec_A and vec_B are stored for later use. The parties then copy their vectors and randomly select and invert n bits of the copied vectors before exchanging them. In the preferred embodiment, n is 3. Each of the parties then respectively, bit-by-bit, employs Exclusive-Or logic to combine its stored m-bit vectors vec_A and vec_B with the vectors, denoted rec_B and rec_A, received from the other party, to generate respective vectors W_A and W_B.

By consequence of the above steps, Party A's W_A and Party B's W_B vectors will both agree within three bits of X, which is vec_A combined bit-by-bit with vec_B through use of Exclusive-Or logic. Parties A and B then generate all $$\binom{64}{3} = 41{,}664$$

64-bit vectors that are within three bits of vectors W_A and W_B, respectively. Each respective one of these 41,664 vectors is converted to an "image" vector by inputting it to a DES in electronic codebook (or ECB-/ENCRYPT) mode keyed with publicly known keying variable $K_1$ and combining the encrypted vector bit-by-bit with its unencrypted form using Exclusive-Or logic. (The electronic codebook is defined in Federal Information Processing Standards Publication number 81.) Both parties save the image vectors in a file which cross-references the image vectors to the specific three-bit pattern which was added to vector W_A or W_B. The parties then exchange all $$\binom{64}{3}$$

of these image vectors. The parties transmit the image vectors in a random order.

Upon receipt of the set of image vectors from Party B, Party A proceeds to search the set for the vectors that precisely match image vectors sent by Party A. Party B does likewise. To minimize the information that can be gleaned by an observer/interloper, and to make the system synchronous, both parties will exhaustively search the entire received set of image vectors.

If the parties both find only two image vectors that match, they proceed; otherwise the process is mutually aborted and retried. It is mathematically clear that Party A can now discern the specific bits that Party B inverted in changing B to rec_B and Party B can likewise determine the three bits that Party A inverted in changing vec_A to rec_A. Thus both parties can form X which is the bit-by-bit Exclusive-Or sum of vec_A and vec_B.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
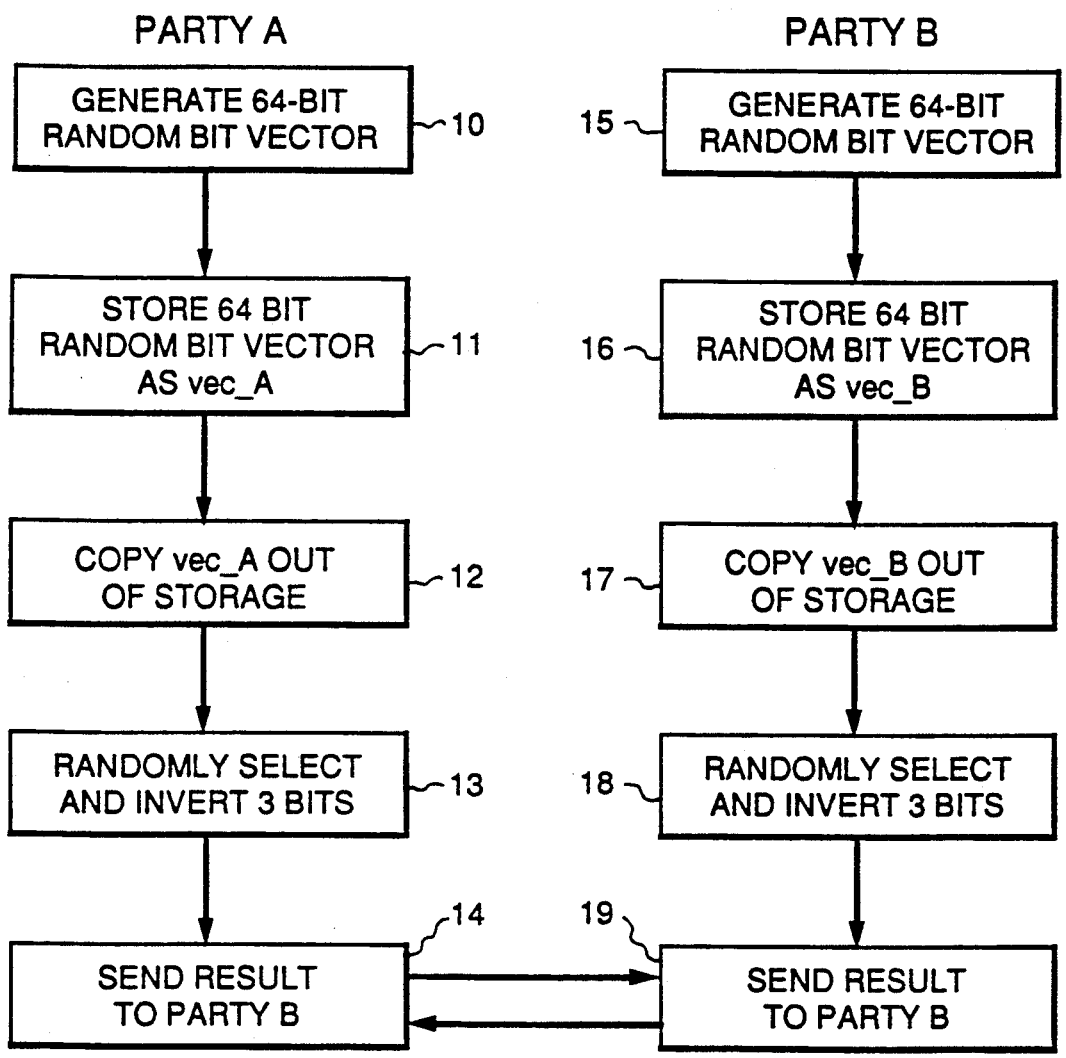
FIG. 1 is a block diagram illustrating the process of generating the random sequences, denoted as vec_A and vec_B, storing these vectors for later use, corruption of the vectors by the bit-by-bit addition (selective inversion) of noise sequences, and exchanging of the corrupted vectors by Parties A and B.

FIG. 1 shows, in block diagram form, the initial processes which take place between and within Parties A and B. Using a random or pseudorandom bit generator, Party A generates a 64-bit random bit vector as depicted in step 10 and stores this vector as vec_A as indicated at step 11. Next, Party A copies the stored vector vec_A out of storage as indicated at step 12, and corrupts the copy of the vector by randomly selecting and inverting three bits as indicated at step 13. This corrupted vector is then sent to Party B, as indicated at step 14. Similarly, Party B uses a random or pseudorandom bit generator to generate a 64-bit random bit vector, as depicted in step 15, and stores this vector as vec_B as indicated at step 16. Party B then copies the stored vector vec B out of storage, as indicated at step 17, and corrupts the copy of this vector by randomly selecting and inverting three bits as indicated at step 18. This corrupted vector is then sent to Party A, as indicated at step 19. In both cases, the random selection of the bits to be inverted can be accomplished with a suitable random or pseudorandom bit generator that provides an essentially equiprobable selection from all possibilities.

Figure 2:
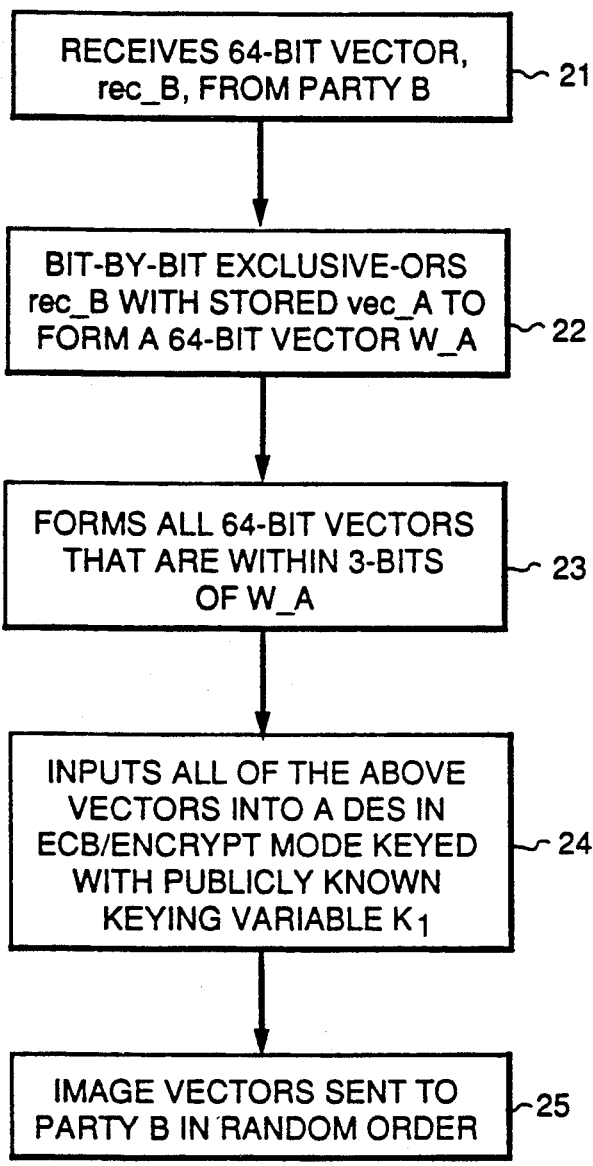
FIG. 2 is a block diagram depicting the process performed by Party A in forming all $\binom{64}{3}$ image vectors and sending that set of image vectors to Party B. (Party B does the same thing.)
Figure 2A:
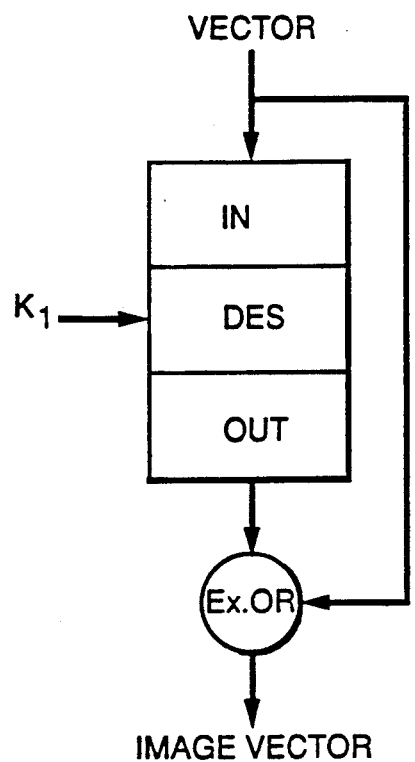
FIG. 2A is a simplified block diagram of the process of forming the image vectors of FIG. 2.
Figure 3:
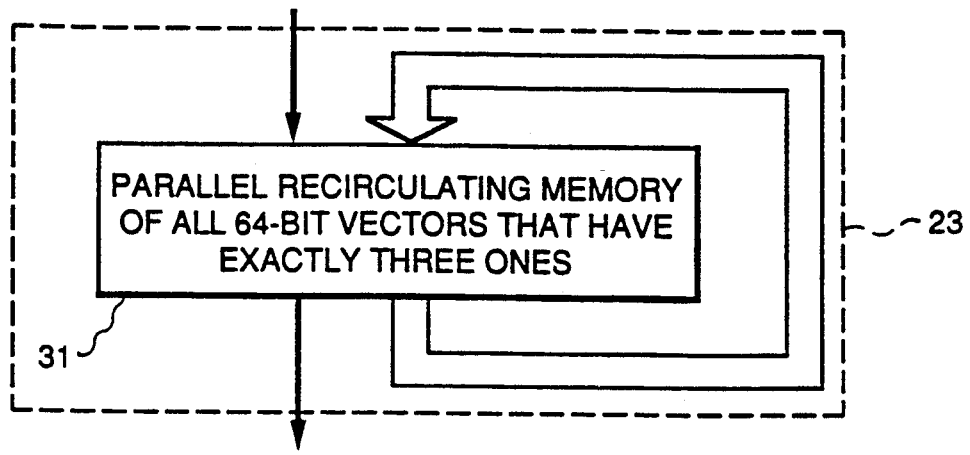
FIG. 3 is a block diagram illustrating the preferred embodiment for producing all $\binom{64}{3}$ 64-bit vectors having exactly three ones.

Both parties receive the respective 64-bit corrupted versions of vectors vec_A and vec_B, which are respectively denoted as vectors rec_A and rec_B. FIG. 2 depicts this process for Party A. As both Parties are executing the same process, the process will be detailed for Party A only. The receipt of vector rec_B is indicated at step 21. Party A then employs Exclusive-Or logic to combine vector rec_B bit-by-bit with its stored (uncorrupted) vector vec_A to form a 64-bit vector W_A. This is indicated at step 22. Party A then forms all 64-bit vectors that are within three bits of vector W_A. Those skilled in the profession might say that Party A forms all 64-bit vectors that are within Hamming distance three of W_A. This is indicated at step 23. Parties A and B can accomplish the production of all 64-bit vectors that are a Hamming distance three vector from W_A in a number of ways. One way is to simply successively add, by bit-by-bit Exclusive-Or, all 64-bit vectors that have exactly three ones (or "Hamming weight" 3) to vector W_A. Algorithms that are capable of producing all m-bit vectors having a given number of ones are available. See, for example, "Efficient Generation of the Binary, Reflected Gray Code and its Applications" by J. Bitner, G. Ehrlich and E. Reingold published in *Communications of the ACM*, Vol. 19, pp. 517-521 (1976), which is herein incorporated by reference. Another way, and the preferred embodiment as shown in FIG. 3, is to build a parallel, recirculating memory 31 of all 64-bit vectors that have exactly three ones in order to implement step 23 of FIG. 2. Party A then inputs all of the vectors formed at step 23 of FIG. 2 into a DES operated in the ECB/ENCRYPT mode keyed with the publicly disclosed (known) keying variable $K_1$. Each output vector is bit-by-bit combined with its unencrypted form, using Exclusive-Or logic, to form an "image vector" as indicated at step 24. All of the image vectors are sent in random order to Party B as indicated at step 25. Both parties retain the correspondence between each image vector and the particular 64-bit, Hamming weight 3 vector, used in producing it. A simplified block diagram corresponding to this process is shown in FIG. 2A.

Both parties then search the image vectors received from each other. One of two outcomes is guaranteed: (1) Exactly vectors will match or (2) many vectors will match. The probability of the first outcome is slightly greater than 78%. It is this outcome that is favorable. If outcome (2) obtains, both parties automatically reset, through a higher level communications protocol, and repeat the entire procedure until outcome (1) obtains. When outcome (1) obtains, both parties know what the secret 64-bit vector, denoted by X, between them should be. From their retained correspondence between each image vector and the particular Hamming weight 3 vector used to produce it, both parties are able to produce the two Hamming weight 3 vectors that are associated with the two image vectors that match. For each party, one of these vectors will be the 64-bit, Hamming weight 3 vector that they used in corrupting their particular vector, vec_A or vec_B, to produce vector rec_A or rec_B, respectively. The other vector will be the 64-bit, Hamming weight 3 vector that the other party used in corrupting its particular vector, vec_B or vec_A, to produce vector rec_B or rec_A, respectively. From this knowledge, both parties create vector X, which is the bit-by-bit Exclusive-Or sum of vectors vec_A and vec_B.

Figure 4:
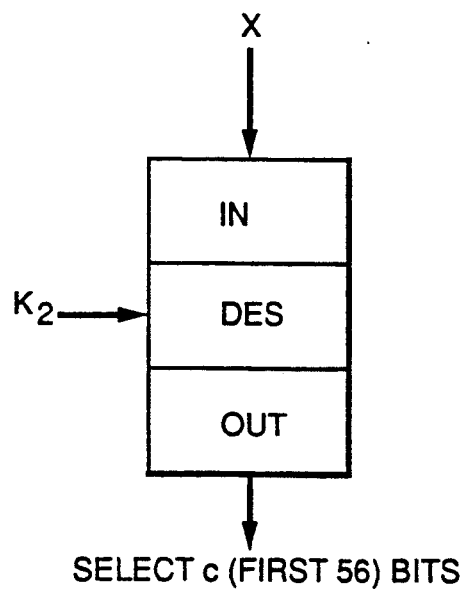
FIG. 4 is a block diagram showing the preferred generation of 56 random bits from the vector X using a publicly known key $K_2$.

Once the Parties have determined vector X, they derive a common keying variable for a "classical" one key cryptosystem, such as the DES, as opposed to a two key public key cryptosystem. The DES requires a 64-bit keying variable. Eight of these keying-variable bits are odd parity check sum bits on 56 random bits. The preferred embodiment for generating the 56 random bits is to use the ECB/ENCRYPT mode of the DES with a publicly known keying variable $K_2$ to encrypt vector X and use a c-bit subset, where c comprises the first 56 bits of the 64-bit cipher result, as indicated in the simplified block diagram of FIG. 4.

Figure 5:
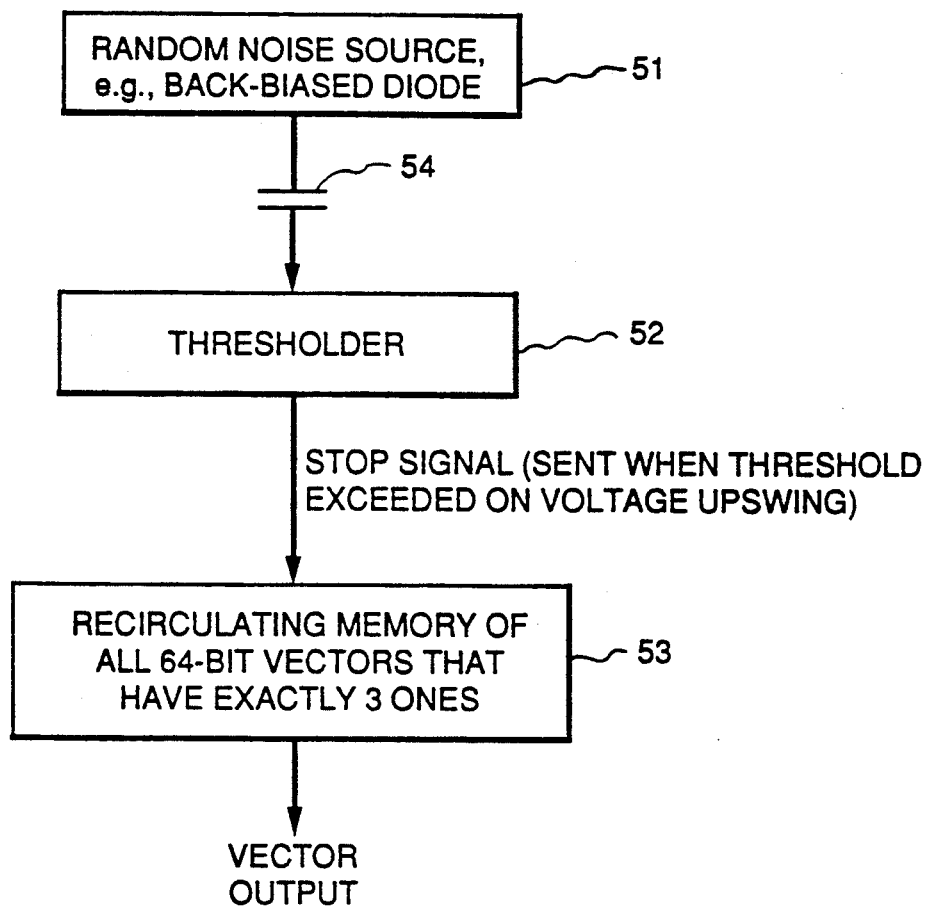
FIG. 5 is a block diagram illustrating random selection of a vector having exactly three ones by Parties A and B.
Figure 6:
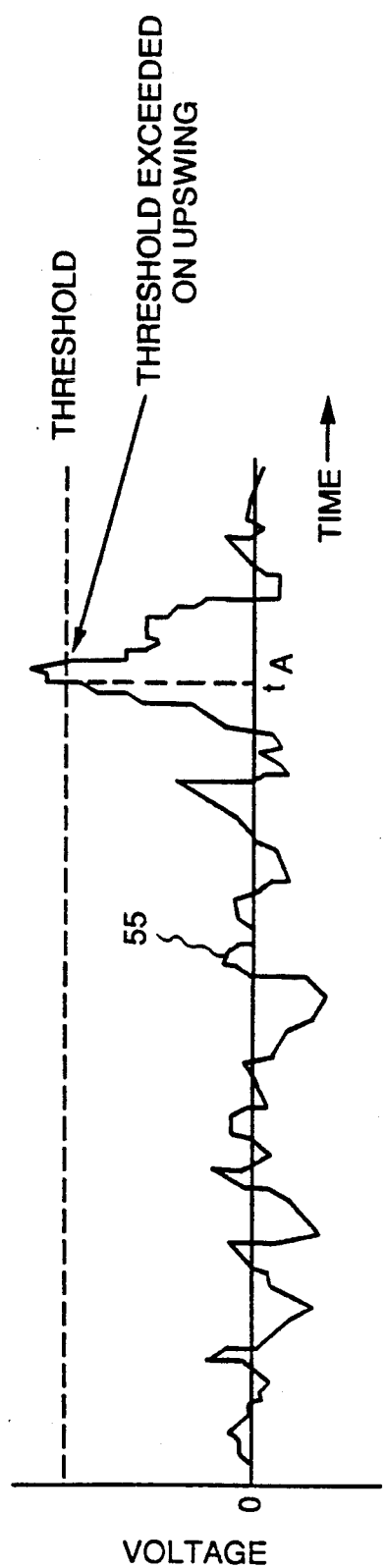
FIG. 6 is a graphical illustration of the thresholder shown in FIG. 5.

Regarding the selection of the bits to be inverted (described with reference to FIG. 1), as shown in FIG. 5 for Party A (Party B mirrors the function), Party A may use its recirculating memory 53 of FIG. 5 (identical to memory 31 of FIG. 3), with other componentry to randomly select the three bits of vector vec__A to be inverted. The memory is circulated and stopped at a random spot. The particular 64-bit vector having exactly three ones is thus randomly selected for bit-by-bit combination with vector vec__A by use of Exclusive-Or logic. The random stopping can be accomplished in any one of a variety of ways. In a preferred embodiment of the invention, a thresholder 52 monitors a randomly produced zero mean noise signal, such as that produced by a capacitive coupling 54 to a back-biased diode 51. When a suitably chosen threshold is exceeded, the memory circulation is ceased and the randomly picked 64-bit vector having exactly three ones is read out. This process is illustrated graphically in FIG. 6, with readout of the randomly picked 64-bit vector having exactly three ones occurring at the same instant $t_4$ when the random zero mean noise signal 55 produced by random noise source 51 of FIG. 5 exceeds a predetermined threshold. A suitably chosen threshold is one for which the probability distribution of the chosen vectors is approximately uniform.

Figure 7:
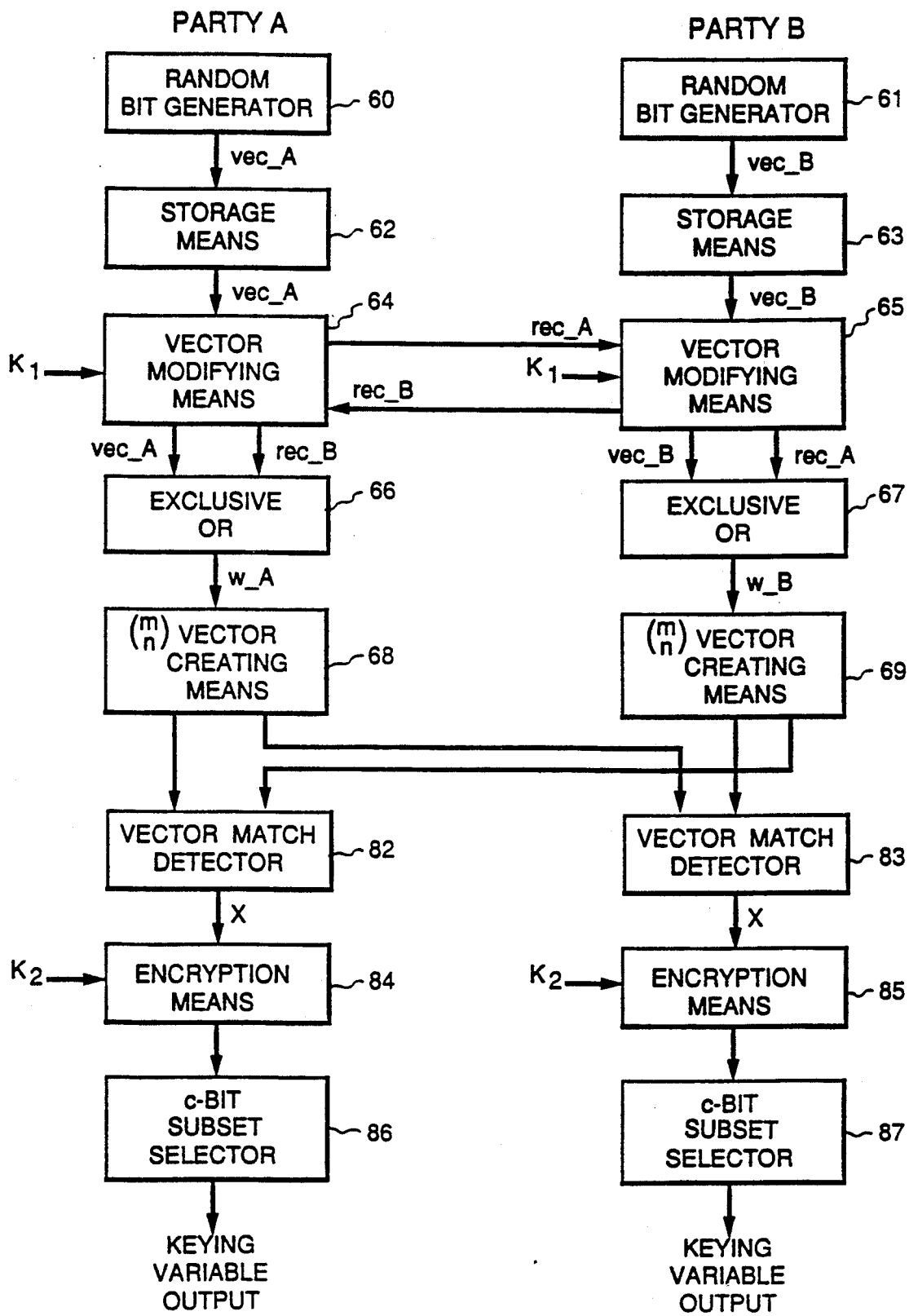
FIG. 7 is a block diagram of a system for performing the process of the invention.

FIG. 7 is a block diagram of a system which performs the process of the invention. A 64-bit random bit vector generator 60 is employed at the location of Party A, while another 64-bit random bit vector generator 61 is situated at the Party B location. Vectors generated by random bit generators 60 and 61, respectively, are stored in storage means 62 and 63, respectively, at the Party A and Party B locations. Vector modifying means 64 and 65, respectively, situated at the Party A and Party B locations, respectively, copy vectors vec__A and vec__B, respectively, from storage means 62 and 63, respectively, and corrupt these vectors by bit-by-bit addition of noise sequences thereto. Vector modifying means 64 also supplies a modified vector rec__A to vector modifying means 65, while vector modifying means 65 supplies a modified vector rec__B to vector modifying means 64. Vectors vec__A and rec__B are encrypted by vector modifying means 64 using publicly known keying variable $K_1$, while vectors vec__B and rec__A are encrypted by vector modifying means 65 using the same keying variable $K_1$. Thus the vector outputs of vector modifying means 64, comprising vectors vec__A and rec__B are supplied to an Exclusive-Or means 66, while vector modifying means 65 supplies vector vec__B, along with vector rec__A received from vector modifying means 65, to an Exclusive-Or means 67.

Exclusive-Or means 66 combines, by bit-by-bit Exclusive-Or logic, vectors vec__A and rec__B to generate a vector W__A, while Exclusive-Or means 67 combines, by bit-by-bit Exclusive-Or logic, vectors vec__B and rec__A to generate a vector W__B.

Each of vector creating means 68 at the Party A location and vector creating means 69 at the Party B location comprises a parallel recirculating memory, such as memory 31 illustrated in FIG. 3. Thus, vector creating means 68 at the Party A location produces all 64-bit vectors that are within Hamming distance three of vector W__A, while vector creating means 69 at the Party B location produces all 64-bit vectors that are a Hamming distance three from vector W__B. The vector output signals produced by vector creating means 68 and 69 represent a Hamming weight three output vector and an image vector, as described in conjunction with the process shown in FIG. 2. Vector match detectors 82 and 83, respectively, situated at the Party A and Party B locations, respectively, receive the image vector from vector creating means 69 at the Party B location and vector creating means 68 at the Party A location, respectively. In addition, the image vectors transmitted by vector creating means 68 and 69, respectively, are also supplied to vector match detectors 82 and 83, respectively, which search at each Party's location, respectively, for two matches between the image vectors transmitted and the image vectors received. If many vectors match, the procedure is repeated, as has been previously described. However, if exactly two vectors match, then Party A and Party B each knows what the secret 64-bit vector X between them should be. At this juncture, encryption means 84 and 85, respectively, at the location of Party A and Party B, respectively, is used to encrypt vector X with a publicly known keying variable $K_2$. Each respective encrypted vector X is supplied to a c-bit subset selector 86 and 87, respectively, at the location of Party A and Party B, respectively, allowing each c-bit subset selector to select a c-bit subset of the 64-bit vector from the respective one of encryption means 84 and 85 for use as a keying variable mutually held by the parties.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method for ensuring secure communications between two Parties, A and B, over an insecure, predetermined bandwidth communication channel between the parties by establishing a commonly held, electronically generated, private cryptographic keying variable between the parties, each party having both transmitting and receiving capability at its respective location, said method comprising the steps of:
   a. establishing a publicly known keying variable $K_1$ for use by both parties;
   b. Party a randomly generating an m-bit vector vec__a, storing said vector vec__A, copying said vector vec__A, corrupting the copied vector vec__A by inverting n bits thereof, and transmitting the corrupted vector vec__A, designated vector rec__A, over the communication channel to the location of Party B;
   c. Party B randomly generating an m-bit vector vec__B, storing said vector vec__B, copying said vector vec__B, corrupting the copied vector vec__B by inverting n bits thereof, and transmitting the corrupted vector vec__B, designated vector rec__B, over the communication channel to the location of Party A;
   d. Party A generating a vector W__A representing the Exclusive-Or combination of the stored vector vec__A with vector rec__B received from Party B;
   e. Party B generating a vector W__B representing the Exclusive-Or combination of the stored vector vec__B with vector rec__A received from Party A;
   f. Party A producing all $$\binom{m}{n}$$

vectors that are n bits different from vector W—a, encrypting said $$\binom{m}{n}$$

vectors with a Data Encryption Standard (DES) operated in the ECB/ENCRYPT mode and keyed by keying variable $K_1$, and producing Party A image vectors representing the Exclusive-Or combination of the $$\binom{m}{n}$$

vectors with their encryptions, and transmitting the Party A image vectors in random order over the communication channel to Party B;

g. Party B producing all $$\binom{m}{n}$$

vectors that are n bits different from vector W—B and encrypting said $$\binom{m}{n}$$

vectors thus produced with a DES operated in the ECB/ENCRYPT mode and keyed by keying variable $K_1$, and producing Party B image vectors representing the Exclusive-Or combination of the $$\binom{m}{n}$$

vectors with their encryptions, and transmitting the Party B image vectors in random order over the communication channel to Party A;

h. each one of Parties a and B thereafter searching the image vectors received from the other Party for exactly two matches with the image vectors transmitted by the one Party;

i. both parties ten determining a commonly held m-bit vector denoted X, equal to the bit-by-bit Exclusive-Or sum of vectors vec—A and vec—B and known only to the parties, for use in deriving a keying variable for a single key encryption algorithm to maintain security for exchanges of traffic;

j. establishing a second publicly known keying variable $K_2$;

k. both parties enciphering m-bit vector X using an encrypting algorithm keyed by said variable $K_2$; and l. each one of Parties A and B then selecting a c-bit subset of m-bit vector X enciphered under keying variable $K_2$ as said private cryptographic keying variable.

2. The method for ensuring secure communications between two Parties, A and B, over an insecure communication channel between the parties, recited in claim 1, wherein n is 3, m is 64 and the c-bit subset comprises the first 56 of the m bits.

3. The method for ensuring secure communications between two Parties, A and B, over an insecure communication channel between the parties, recited in claim 1, wherein said encrypting algorithm is the DES.

4. A public key mechanism for ensuring secure communications between two Parties, A and B, by establishing a commonly held, electronically generated, private cryptographic keying variable between them, each party having means for both transmitting and receiving data over an insecure, predetermined bandwidth communication channel, said mechanism comprising:

a. first and second random bit vector generators respectively controlled by Parties A and B for randomly generating m-bit vectors denoted vec—A and vec—B;

b. first and second vector storage means for storing said vectors vec—A and vec—B respectively;

c. first and second modifying means, respectively, for copying said vectors vec—a and vec—B and corrupting said vectors vec—a and vec—B by bit-by-bit addition of noise sequences;

d. first and second communication means for exchanging between the Parties A and B the vectors modified by said first and second modifying means, respectively, received vectors being denoted as vectors rec—B and rec—A respectively, said first communication means including the transmitting means of Party A and the receiving means of Party B, and said second communication means including the transmitting means of Party B and the receiving means of Party A;

e. first and second Exclusive-Or means for respectively combining by bit-by-bit Exclusive-Or logic the stored m-bit vectors vec—A and vec—B, respectively, with the received vectors rec—B and rec—A, respectively, to generate respective vectors W—a and W—B;

f. first and second parallel recirculating memories for creating all $$\binom{m}{n}$$

vectors at Hamming distance n from vectors W—A and W—B respectively, encrypting said $$\binom{m}{n}$$

vectors and adding said $$\binom{m}{n}$$

vectors to their encryptions to produce image vectors;

g. said first and second communication means allowing said Parties A and B to exchange with each other, in random order, said image vectors;
h. first and second match detector means for searching, for each respective party, for two matches between the image vectors transmitted by said respective party and the image vectors received by said respective party;
i. first and second means coupled, respectively to said first and second match detector means, respectively, for constructing vector X form the matches of image vectors, said vector X being a secret m-bit vector known only to Parties A and B when said two matches, and only said two matches, exist;
j. encryption means for enciphering the vector X using an encryption algorithm keyed by a publicly known key $K_2$ to generate an m-bit value; and
k. selecting means for selecting a predetermined c-bit subset of said m-bit value as said private cryptographic keying variable.

5. The public key mechanism of claim 4 further including thresholder means coupled to each of said parallel recirculating memories, respectively, for monitoring a randomly produced zero mean noise signal such that memory circulation is ceased and a randomly generated m-bit vector having three ones is read out when a predetermined threshold is exceeded by said signal.

* * * * *